US005748114A

United States Patent [19]
Koehn

[11] Patent Number: 5,748,114
[45] Date of Patent: May 5, 1998

[54] FLAT INPUT KEYBOARD FOR DATA PROCESSING MACHINES OR THE LIKE AND PROCESS FOR PRODUCING THE SAME

[76] Inventor: Matthias-Reinhard Koehn, jahnstr. 8, 12347 Berlin, Germany

[21] Appl. No.: 632,413

[22] PCT Filed: Oct. 25, 1994

[86] PCT No.: PCT/DE94/01297

§ 371 Date: Apr. 24, 1996

§ 102(e) Date: Apr. 24, 1996

[87] PCT Pub. No.: WO95/12208

PCT Pub. Date: May 4, 1995

[30] Foreign Application Priority Data

Oct. 26, 1993 [DE] Germany ............... 9316733 U
Jul. 12, 1994 [DE] Germany ............... 44 24 496.7

[51] Int. Cl.⁶ .................. H03K 17/94; H03M 11/00
[52] U.S. Cl. .................. 341/22; 341/23; 364/709.01; 364/709.08; 361/749; 200/5 A
[58] Field of Search ........... 200/5 A, 86 R; 364/708.1, 709.01, 709.08, 709.11; 341/20, 22, 23; 361/749, 792, 793, 795; 174/254, 255

[56] References Cited

U.S. PATENT DOCUMENTS

| | | | |
|---|---|---|---|
| 3,699,294 | 10/1972 | Sudduth | 200/5 A |
| 4,634,818 | 1/1987 | Hayes-Pankhurst et al. | 200/5 A |
| 5,220,521 | 6/1993 | Kikinis | 364/709.08 |
| 5,340,955 | 8/1994 | Calvillo et al. | 200/302.2 |
| 5,401,922 | 3/1995 | Asta | 200/5 A |
| 5,459,461 | 10/1995 | Crowley et al. | 341/22 |
| 5,521,345 | 5/1996 | Wulc | 200/317 |
| 5,565,657 | 10/1996 | Merz | 178/18 |
| 5,648,771 | 7/1997 | Halgren et al. | 341/22 |
| 5,666,112 | 9/1997 | Crowley et al. | 341/22 |

OTHER PUBLICATIONS

IBM (Technical Disclosure Bulletin) vol. 33 No. 9 Enlarged Cursor Key with Trackball, p. 428, Feb. 1991.

*Primary Examiner*—Jeffery Hofsass
*Assistant Examiner*—Timothy Edwards, Jr.
*Attorney, Agent, or Firm*—Young & Basile, P.C.

[57] ABSTRACT

A flat input keyboard for data processing machines or the like has the following successive layers, starting from the side facing away from the operation side: a supporting layer (10), an electric switching system (12, 16, 20) with electric contact spots that correspond to a keyboard pattern, a buffer layer (24) and a flexible elastic covering layer (26) provided on the operation side facing away from the electric switching system with a keyboard pattern (28). The supporting layer, the electric switching system, the buffer layer and the covering layer are interconnected at least along their circumference. The flat input keyboard is characterized in that the switching system is permanently flexible around roll axes as it is made up of segments (17) of at least one sheet, and is provided with a seamless casing (48) in a single piece since the supporting layer and the buffer layer are interconnected at their edges; the switching system is provided with flow openings (19) and the buffer layer and covering layer are interconnected over their whole surface. Also disclosed is a process for producing such a flat input keyboard.

51 Claims, 6 Drawing Sheets

FLAT INPUT KEYBOARD FOR DATA PROCESSING MACHINES OR THE LIKE AND PROCESS FOR PRODUCING THE SAME

The invention relates to a flat input keyboard for data processing machines or the like, which, starting on the side facing away from the operation side, has the following successive layers: a supporting layer, an electric switching system with electric contact spots corresponding to a keyboard pattern, a buffer layer and a flexible elastic covering layer having a keyboard pattern and provided on the operation side facing away from the electric switching system, whereby the supporting layer, the electric switching system, the buffer layer and the covering layer are interconnected at least along their circumference, characterized in that, by being made up of segments of at least one sheet, the switching system is formed permanently flexible around the roll axis(axes); and that, by having the supporting layer and buffer layer interconnected at their edges, by having flow openings provided in the switching system and by having the buffer layer and the covering layer being interconnected over their whole surface, the electric switching system is provided with a one-piece seamless casing; also disclosed is a process for producing such a flat input keyboard.

The electric switching system, to which is assigned an evaluation logic, consists generally of three sheets laminated onto each other, namely a first contact sheet, a second contact sheet and a spacer sheet between these, whereby the latter is generally punched and has openings at the contact spots provided. On the sides facing towards the spacer sheet, the two contact sheets preferably have printed layers of electroconductive lacquer. It may be provided that one of the two contact sheets can carry all of the electric conductors. These are then frequently embodied with the contact spots in such a way that here two conductor ends reach into each other in a comb-like manner. The other contact sheet then has at its contact spots a complete print-on of electroconductive lacquer. However, it may also be provided that both contact sheets carry conductors, with the result that the number of conductor crossings can be reduced on one of the contact sheets, if need be. The contact sheets and the spacer sheet generally consist of plastic material.

When force is applied to the covering layers at a contact spot defined by the keyboard pattern, i.e. when a "key" is pressed, at the point of pressure the contact sheet nearest to the covering layer bends over the edges of the corresponding cut-outs in the contact sheet and comes into contact with the contact spot of the lower contact sheet. This contact provides an electrically conducting connection between the upper and lower contact spots. In this configuration, while connected an electric current can flow through the conductors in the upper contact sheet to provide a signal from which it is then possible to evaluate the key pressed.

Besides flat keyboards of the above described type, other types of keyboards comparable with typewriter keyboards with respect to their key form and key arrangement may be used for entering data on data processing units, such as, for example, so-called notebooks. Thereby provision may be made for keys with a relatively large key stroke. All keyboards used hitherto have a hard housing or at least a rigid baseplate.

Rubber keyboards are an exception from this; however, these do not follow the principle of the membrane keyboard used here.

Conventional keyboards have a number of disadvantages, particularly the fact that when transporting such keyboards, especially in conjunction with portable computers (notebooks), the keyboard requires a great deal of space compared with the other function units of the computer, and it is relatively heavy. However, if the size of the keyboard is reduced such that it is adapted to the size of the portable computer, it becomes ergonomically disadvantageous. Conventional keyboards are rigid and thus bulky when transported, moved and stored. On membrane keyboards contact reliability is generally assured through the use of domelike formed design membrane keyboards. These usually offer considerable resistance to finger pressure and thus prevent comfortable and speedy keyboard operation. Membrane keyboards without the domelike design generate no tactile response and thus do not indicate to the user when they are actuated.

The tactile response according to the present invention is provided through the make-up of the elastic material used. Further, the key forms possible here can be equated to the key forms of mechanical keyboards, so that finding the keys themselves is considerably easier than on conventional membrane keyboards.

The height of mechanical keyboards is generally ergonomically unfavorable for hand-held use when no support surfaces are provided for the balls of the thumbs. Furthermore, at work the height of the keyboard hinders work with other equipment unless flat input keyboards of the described kind with their respective ergonomically disadvantageous handling are provided. Frequently such keyboards are also not protected against inadvertent key actuation, which in some user programs can lead to uncontrolled effects and even loss of data. Furthermore, mechanical keyboards generate considerable keystroke noise, which can be disturbing to others in the vicinity. Often where notebook keyboards are concerned, transportable keyboards use a non DIN 2137 standard layout with considerably less key spacing and smaller keys, which has a particularly detrimental effect on the ease of operation.

All keyboards are susceptible to contamination and damage through chemical and physical influences. By means of the one-piece casing and the materials used, the object of the invention is insensitive to moisture and other detrimental effects. Further, the keyboard can be easily cleaned, even with a jet of steam.

For economical reasons, mechanical keyboards are generally limited with respect to their design scope, because the upper side generally consists of approx. 100 individual keys, and these can only be incorporated into a uniform design with great effort.

The structure and material used in the object of the invention provides great scope for design and production flexibility. Even without printing it is generally possible to provide multicolored keyboards by dying the plastic material, and these show optimum color penetration even when there is surface damage.

Plain color changes for these keyboards are no problem even under economic aspects.

Design changes to the key shapes and edge webs can be implemented just as quickly and efficiently.

The object of the invention is to provide a flat input keyboard as well as a process for producing it, where this keyboard, although having optimum size for working, has the smallest possible size when transported; further it must be waterproof and insensitive to chemical and mechanical effects and at the same time the disadvantages of hitherto known keyboards must be eliminated.

According to the invention, this object is achieved by means of at least one of the sheets of the electric switch system consisting of sheet segments, while the supporting layer, buffer layer, covering layer and the circumferential edge together form an elastic casing so that the electric switching system is permanently flexible around the roll axis (axes) and is waterproof.

The invention also suggests that the electric switching system comprises an electric switching system which, following the covering layer, successively comprises a first contact sheet with an electroconductive first contact layer that is at least regionally applied on the side facing the covering layer, a spacing facility with openings corresponding to the keyboard pattern, and a second contact sheet with an electroconductive second contact layer that is at least regionally applied on the side facing the spacing facility.

Provision may also be made for an elastically yielding buffer layer placed between the second contact sheet and the covering layer.

The invention also provides that the spacing facility may be at least partially comprised of discrete spacer elements surrounding contact spots arranged according to the keyboard pattern.

According to the invention it may also be provided that the spacer elements have an essentially circular ring formed embodiment.

The invention also suggests that one of the contact sheets may be at least regionally comprised of discrete contact spots according to the spacer elements.

It may also be provided that the contact spots are essentially circular ring-shaped in form.

Thereby it may also be provided that one of the contact sheets carries all of the discrete electric conductors.

The invention also suggests that the conductors reach into each other in a comb-like manner at the contact spots corresponding to the keyboard pattern.

Thereby it may be provided that the contact regions on the side facing towards the spacing elements are essentially fully electroconductively coated and that at least one continuous contact sheet carries the discreet electric conductors.

The invention also provides that the electric contact spots of the contact sheet are arranged in rows parallel to the roll axis.

The invention provides that at least one of the sheets consists of sheet segments, which either enclose contact spots or contact openings and form air ducts. Furthermore it is provided that more than one sheet, in the utmost case all sheets of the electric switching system, consist of sheet segments.

This segmentation permanently prevents the sheets from shifting with respect to each other when the electric switching system is bent.

The invention also provides that the supporting layer, the electric switching system, the buffer layer and the covering layer are formed in an essentially elongated manner; and that the covering layer has essentially rigid first edge webs parallel to the roll axis.

The invention also suggests that the first edge webs can be releasably connected with the covering layer, the electric switching system, the buffer layer and the covering layer. It may also be provided that at least the second edge webs are formed flexibly around the roll axis.

According to the invention, both edge webs may be fixed components of the casing.

The invention provides that a part of the buffer layer as well as the keyboard pattern of the covering layer may be formed as the operating surface for a computer mouse.

The invention is also characterized by a detachable plug connection for connecting it to the data processing unit or similar equipment.

The invention also provides that the plug connection may be integrated in one of the edge webs.

According to the invention the end of the connecting cable may be firmly enclosed in one of the edge webs.

According to the invention it may also be provided that a control unit is integrated in one of the edge webs.

The invention also suggests that the control unit may be embodied as an SMD module.

It may also be provided that an illumination facility illuminating the keyboard pattern from the edge may be integrated in at least one of the edge webs.

The invention suggests that optical display facilities may be integrated in a part of the keyboard pattern the covering layer or in the edge webs.

The invention suggests that acoustic display facilities may be integrated in a part of the keyboard pattern, the covering layer or in the edge webs.

The invention suggests that transmit or receive facilities for digital signals may be integrated in a part of the keyboard pattern, the covering layer, the buffer layer or in the edge webs.

The invention suggests that power sources may be integrated in a part of the keyboard pattern, the covering layer, the buffer layer, the circumferential edge web or in the edge webs.

The invention is further characterized by an accessory base embodied as a support plate and/or baseplate for holding the casing and, if need be, the edge webs.

Thereby it may be provided that the upper side of the baseplate has a recess with a flat support surface for taking up the supporting layer and or the support plate and if need be the edge webs in a form-closed manner.

The invention also provides that the electric switching system may have a sensor keyboard that is essentially free of mechanically movable function elements.

In accordance with the invention it may also be provided that the electric switching system may have a short-stroke keyboard with short-stroke keys rigidly attached to a flexible board or the like.

Furthermore the invention is characterized by air chambers extended in accordance with the keyboard pattern and for use under extreme pressure conditions or the like.

It may also be provided that the electric switching system is cast in an elastic plastic material, which then in one piece forms the supporting layer, the buffer layer, the covering layer and a circumferential edge web joining these, and circumferences the electric switching system.

The invention also provides that the supporting layer, the buffer layer and the covering layer are joined to each other via a number of connecting webs passing through the flow openings of the electric switching system, whereby the relative positions of the function elements of the electric switching system are joined to each other.

According to the invention, the process for manufacturing such a keyboard is characterized in that the electric switching system is cast in the plastic material whereby the supporting layer, the buffer layer, the covering layer and the one-piece interconnecting circumferential web joining these, including the edge webs, are provided.

The invention suggests that elastically curing plastic material be used for this process.

Alternatively to casting, injection molding of thermoplastic or thermosetting plastic materials or steam treatment in a closed form may be used.

The invention provides that casting is done by means of a liquid castable and then curable elastomeric material.

The invention also provides that a casting mold be used, the inner dimensions at base level of which exceed the outer dimensions of the electric switching system on all sides by the width of the circumferential web to be formed. Into this casting mold is poured first the covering layer and the buffer layer whereby the first layer of the plastic material is allowed to at least partially cure; that next the at least partially cured covering layer and buffer layer are left in the mold and the electric switching system is introduced into the mold and placed on the supporting layer whereby a border is left the width of which corresponds to the circumferential web to be formed; that then further liquid castable plastic material is added whereby the circumferential edge strip is filled up and the electric switching system is covered to a height corresponding to the thickness of the supporting layer; that following this the entire plastic material is finally fully cured; and that then the one-piece tightly enclosed flat input keyboard is removed from the mold.

Following the casting or injection molding, steam treating and curing and, if need be, the removal process from the mold have been completed, provisions can be made to provide the covering layer with the keyboard pattern.

The invention also suggests that an electric switching system be used that has a multiplicity of open openings both on the side where the supporting layer is to be provided as well as on the side for the covering layer and the buffer layer; and that these openings be filled with the casting material so that after the material has cured the electric switching system is intermeshed by a single-piece plastic matrix consisting of the supporting layer, the buffer layer, the covering layer, the circumferential edge web and connecting webs passing through the openings in the electric switching system and fixing the functional elements of the latter in spatially defined positions.

It may also be provided that the plastic material used is polyurethane.

The invention also provides that the plastic material used is silicone.

A further embodiment of the process according to the invention for manufacturing an essentially elongated flat input keyboard with a roll axis parallel to one of the sides is characterized by, that those sections of the circumferential web parallel to the roll axis are essentially rigid, while the sections perpendicular to the bending or roll axis are essentially flexible. Provision can thereby be made that the stiff bendable sections of the circumferential web can be made differently strong.

The invention further suggests that, if required, different plastic materials can be used for the rigid and the flexible sections of the circumferential web.

Finally, the object of the invention is to provide a flat input keyboard by using the method of the present invention.

The invention is also based on the knowledge that the disadvantages of known keyboards can be overcome and that an ergonomically perfect keyboard with optimum work areas and least possible space requirements during transport can be provided by using an overall flexible flat input keyboard, which, when not in use, can be rolled together and then easily stored with minimum space requirements. It can thereby be provided to form a buffer layer in such a way that improved force distribution and a more comfortable key feeling is obtained. Such a buffer layer is first mentioned in DE 3132481 A1. There this layer consists of foam and is glued to the covering layer. The object of the present invention is to produce the buffer layer and the covering layer in one piece while producing embossed keys. The keyboard can, if necessary, be installed on correspondingly formed accessory bases, which serve as a baseplate or the like and are form-closed or force-locked and can be readily detached again at any time. Entries from the keyboard can be switched on or off by pressing certain key combinations.

A particular advantage is that the keyboard of the present invention is insensitive to moisture; further it is easy to maintain and requires little attention because, due to the keyboard's insensitivity to moisture, it can be cleaned simply by washing. Of course the flat input keyboard can also be reliably used on a non-plane, firm support. Further, it is of course also possible to integrate into the keyboard an operating panel of any kind for any type of display, e.g. LEDs and displays as well as acoustic signaling facilities, power sources as well as transmission and receiving units for digital signals.

For a special embodiment of the flat input keyboard according to the present invention, a casting method is applied using liquid castable elastic, thermoset or thermoplastic materials.

The electric switching system is cast together with this plastic material, whereby it is possible to either cast-in the electronics needed for e valuating the keyboard matrix signals, or it is possible to merely make provisions that the circumferential web cast in the process incorporates a lead to the conductors of the electric switching system.

The casing according to the invention preferably thus no longer uses separate supporting layers and covering layers; rather these are produced by casting in situ. Thereby either an electric switching system or a rigid or flexible circuit board can be used, on to which keys or switches can be installed. The casting process can, for example, be performed in an open mold in a manner by which either first the covering layer and the buffer layer or the key side of the key pattern of the flat input keyboard are cast "upside-down" so to speak and then allowed to partially cure. Next the electric switching system is also inserted upside-down on the partially cured layer, i.e. the layer forming the covering layer, whereby the edges around the electric switching system and over the first cast layer initially remain open. Next the second layer of liquid plastic material is cast over the electric switching system in the mold. To improve adhesion it is possible to apply adhesive or other suitable substance to the open upper surface of the first layer. The last cast layer either binds with the already cast layer because of the material properties of the plastic material or because of the adhesive effect of the adhesive applied, and does so in such a way that a waterproof and tear resistant bonding is achieved. Of course, during the casting process care is taken to ensure that no casting material can penetrate into the electric contacts. With contact membrane systems this can be achieved through cementation, while with short-stroke keys this can be achieved through corresponding design considerations with rubber seals or the like.

It is noted that desired bending lines can be applied to the keyboard in any arrangement parallel to the proposed roll axis, whereby the roll axis does not necessarily have to run parallel to any one of the side edges of the keyboard. These desired bending lines may in particular also be provided through the lamella-like arrangement of sheet segments. Of course it is also possible, if required, to at least partly provide the edge webs as telescopic elements or also in the form of individual elements joined by bracing wire, so that in the operating condition a rigid frame can be provided for the flat input keyboard while during storage or transport only a minimum of space is required.

Further advantageous embodiments of the invention are achieved through the claims and through the following description in which various embodiment examples are described on the basis of the schematic drawing provided. The figures are described as follows:

Figure 1:
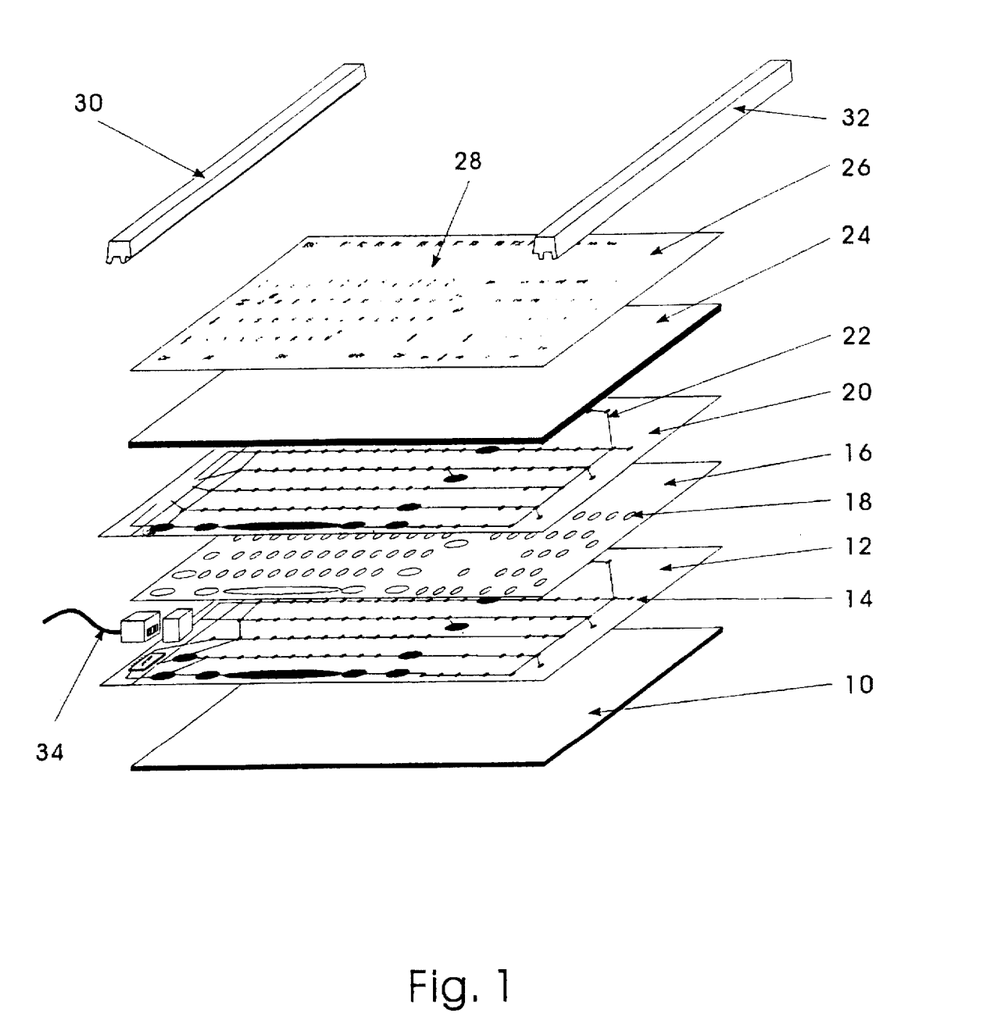
FIG. 1 shows a perspective exploded view diagram of a first simplified embodiment example of a flat input keyboard in accordance with the invention.

As seen in the embodiment example in FIG. 1, the flat input keyboard according to the invention has a flexible supporting layer 10 of plastic material, a first contact sheet 12 having a first contact layer 14 in the form of discrete electric conductors, a spacing layer 16 embodied flexibly and carrying a number of openings 18 corresponding to the keyboard pattern, a second contact sheet 20 having a second contact layer 22 in the form of discrete electric conductors and also consisting of elastically bendable plastic material, a yielding elastic buffer layer 24 made of plastic material and a covering layer 26 made of plastic material having been provided with the keyboard pattern 28. The above described layers can be held together by fixed edge webs 30, 32 along the narrower sides. A detachable plug connection 34 provided facilitates connecting the keyboard to a data processing unit, e.g. a notebook computer.

The representation of the electric switching system (12, 16, 20) shown here is simplified. In conventional membrane keyboards the sheets are applied in the closed manner shown here.

The covering layer is shown here in the form of a sheet, which is a common application of design sheets in conventional membrane keyboards. The detachability of the edge webs and cables represents an alternative embodiment.

Figure 2:
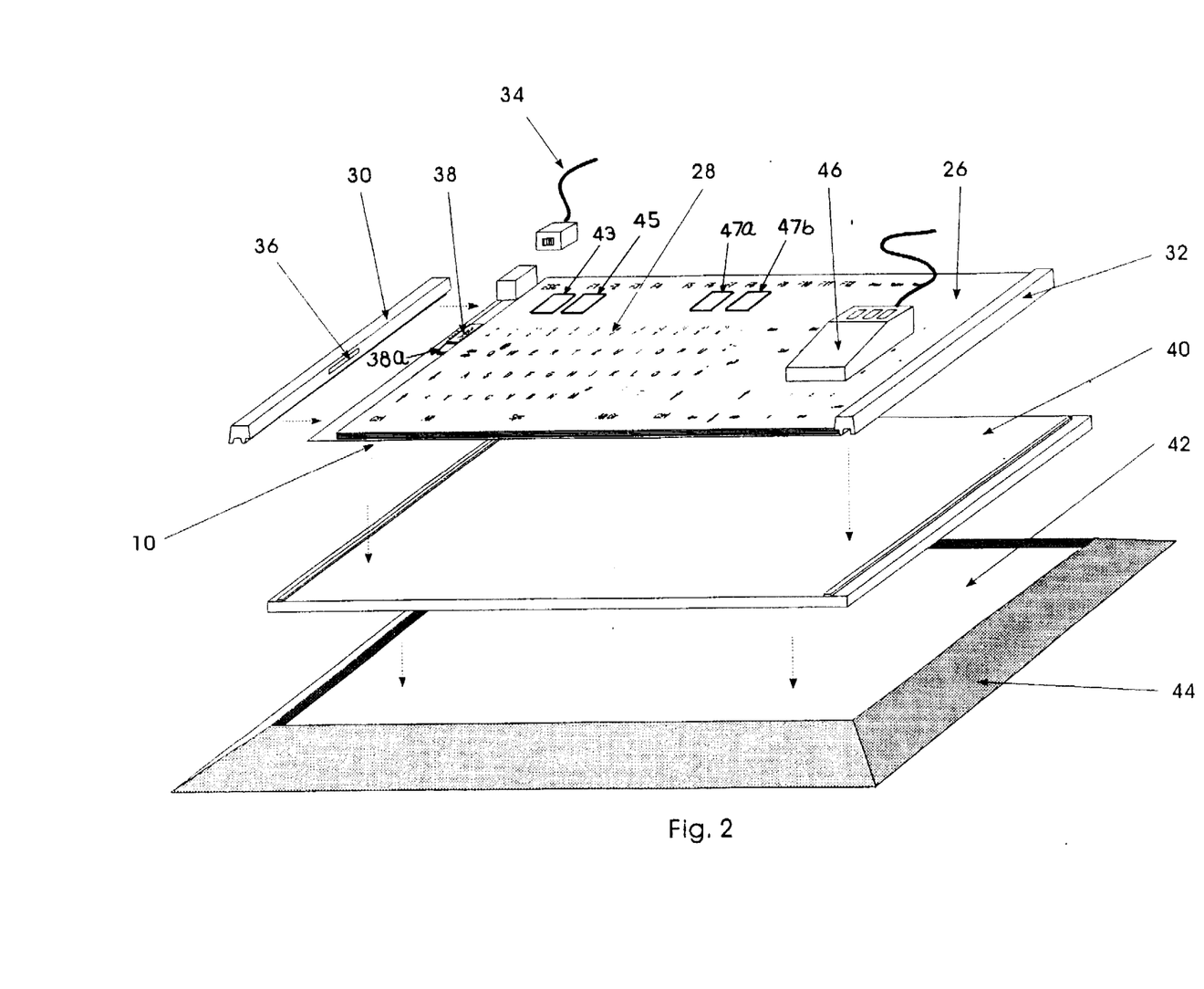
FIG. 2 shows a perspective exploded view diagram of a second simplified embodiment example of a flat input keyboard in accordance with the invention.

As shown in FIG. 2, the flat input keyboard embodiment according to FIG. 1 can be expanded by an illumination facility 36 integrated in the edge web, whereby the said illumination unit illuminates the keyboard pattern 28 from the side. Further, FIG. 2 shows a control unit 38 integrated on the edge of the flat input keyboard near the edge web 30. The control unit may be embodied as an SMD module 38a in a fashion as is known by those skilled in the art. In addition to these elements further elements and devices described in the claims can be incorporated in the edge webs. The flexible part of the flat input keyboard, which ends in the supporting layer 10 on its underside, can be inserted into a thin rigid support plate 40 in a form-closed manner, whereby the edge webs 30 and 32 can be mounted onto this said plate. On the other hand, the support plate 40 can be inserted in a form-closed manner into the recess 42 of a baseplate 44. In the embodiment example shown in FIG. 2, a part of the keyboard pattern 28 is formed as an operating area for the computer mouse 46. Alternatively or as a supplement it is also conceivable to integrate optical and acoustic reproduction units 43 and 45 respectively here. Also, transmitter and receiver units 47a, 47b respectively, for digital signals may be integrated in a part of the keyboard pattern 28 and covering layer 26, the buffer layer 24 or in the edge webs 30, 32. The additional optional units could be incorporated in a fashion as is known by those skilled in the art.

The flat input keyboard according to the embodiment examples shown in FIG. 1 and FIG. 2 is used as described in the following:

In its stored condition, i.e. without the support plate 40 or the baseplate 44, which are both rigid in form, the extremely flat designed flat input keyboard is in accordance with the invention so flexible that it can be rolled up on a roll axis lying parallel to the edge webs 30, 32 in FIG. 1 and FIG. 2; the flat input keyboard can then be stowed away with minimum space requirements. Compared with conventional keyboards, in accordance with the invention, the flat input keyboard combines the advantages of improved mobility resulting from light weight and flexibility with the advantage of a complete keyboard with a standard layout and normal DIN standard key spacing. The flat design of the flat input keyboard permits it to remain on the desk even when other types of work are to be performed there. To prevent accidental actuation of keys on the keyboard pattern 28 in this condition, at least one special key combination can be used to switch off the flat input keyboard.

As FIG. 1 and FIG. 2 show, the keyboard is modularly structured. The actual flat input keyboard, consisting of the supporting layer 10, the first contact sheet 20, the buffer layer 24, and the covering layer 26, can with the help of the correspondingly formed rigid edge webs 30, 32, be fastened on various bases in a form-closed manner, for example also on support plate 40, or also directly or indirectly, as is the case with the embodiment example in FIG. 1, on to a baseplate 44 or the likes. At least two different bases are provided as accessories. One consists of a simple, level and thin and yet rigid support plate 40, preferably made of plastic, which can be used as an underlay when the work surface in mobile operating conditions is uneven. The second base is a larger, more rigid component in the form of a baseplate 44, in the recess 42 of which, the flat input keyboard can be inserted together with the above described support plate 40. This second base, i.e. baseplate 44 is provided for stationary operation on a desk or similar work condition.

The electronic control unit 38 with a plug connector for an electric connection consists of a flat functional unit mounted on the side of the keyboard in the edge area of the same.

Because of its low weight, its flexibility and its low height, the flat input keyboard in accordance with the embodiment examples in FIG. 1 and FIG. 2 can be transported easily with minimum space requirements. For the purpose of transporting, the actual keyboard can be disconnected from the data processing unit via the detachable plug connection 34 on the side of the keyboard. However, for industrial applications, this detachable connection is done without so that the requirements with respect to moisture sensitivity can be complied with.

Figure 3:
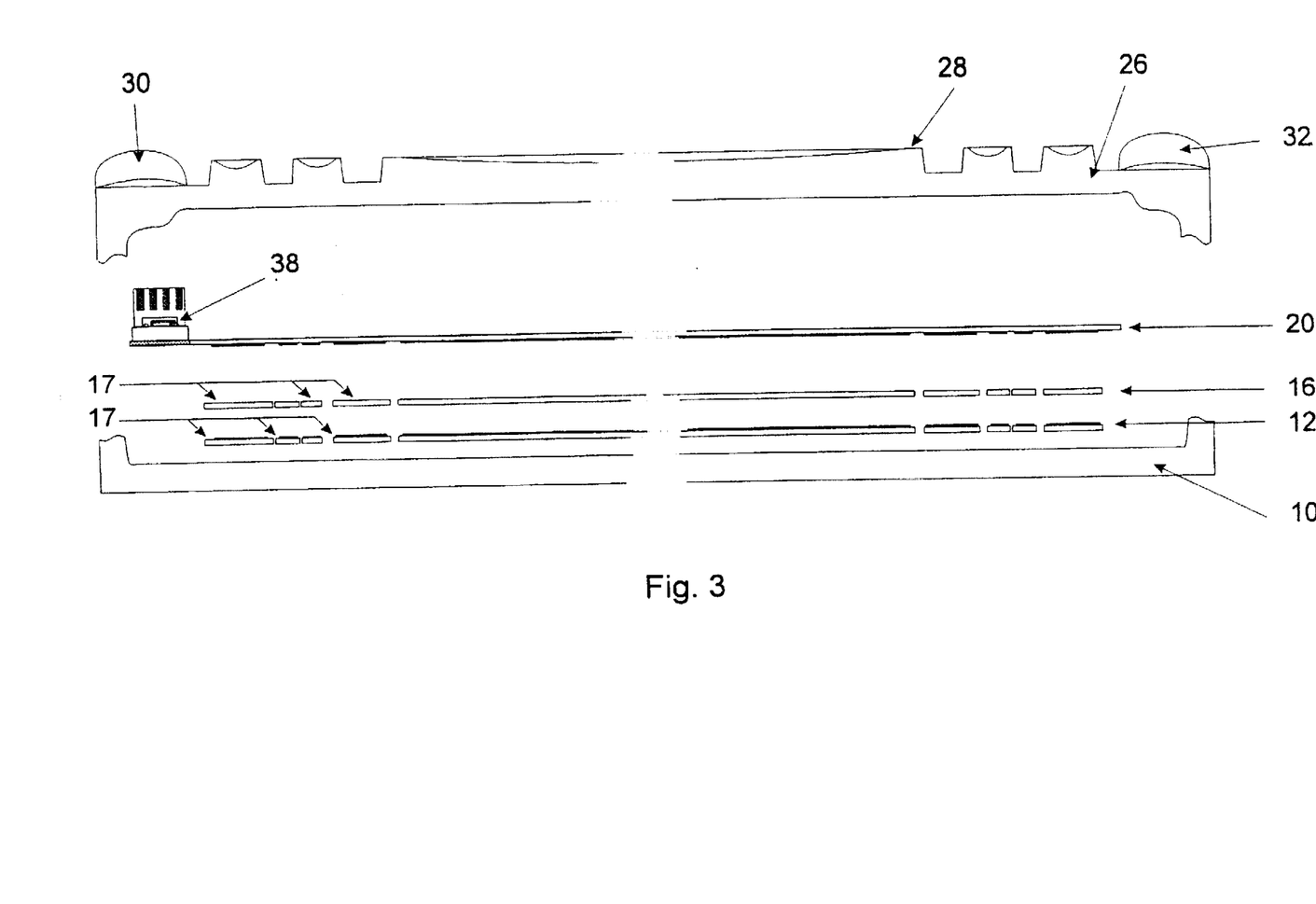
FIG. 3 shows a section vertical to the keyboard plane of a third simplified embodiment example of a flat input keyboard in accordance with the invention.
Figure 4:
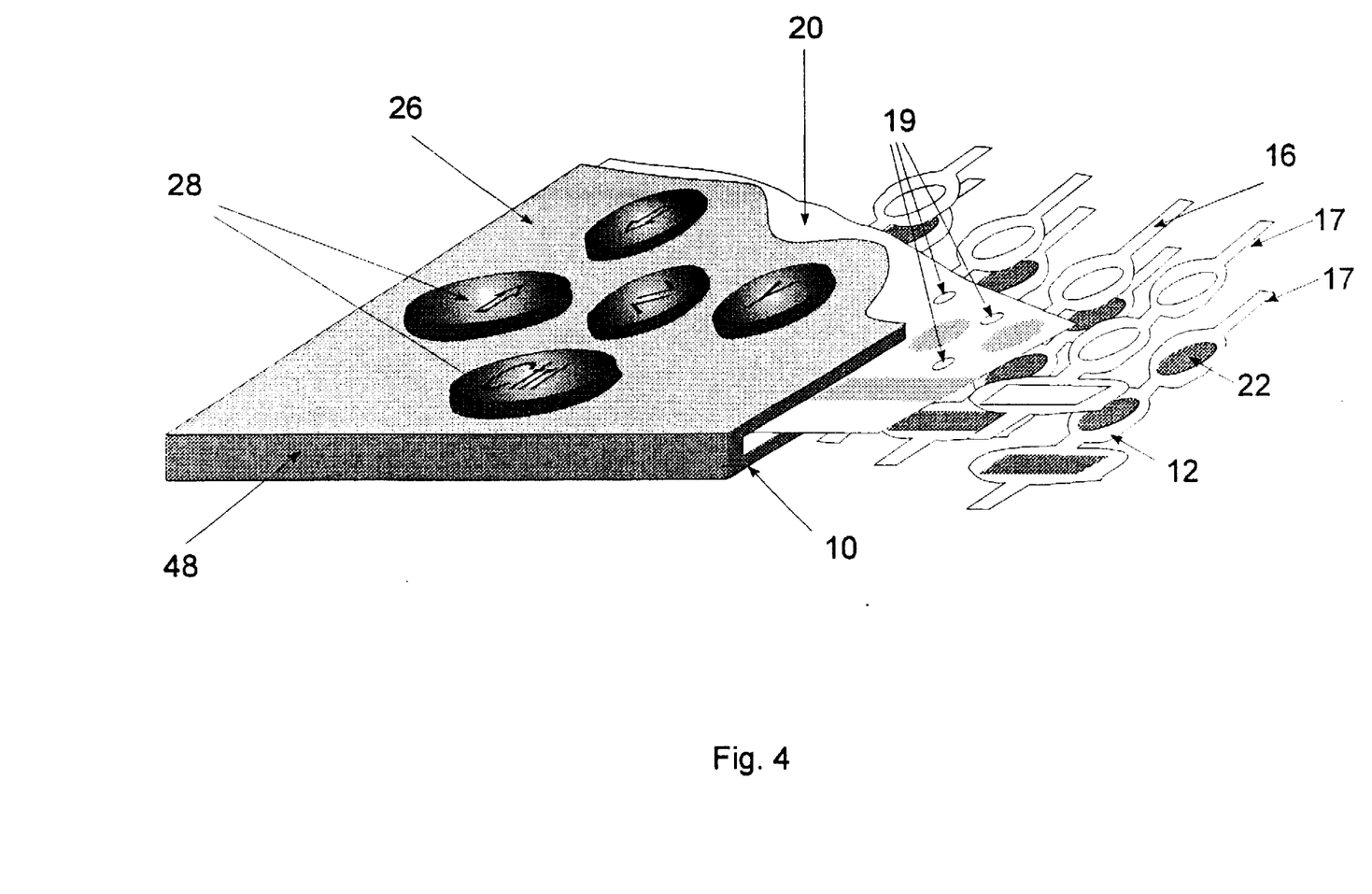
FIG. 4 shows a perspective view diagram of the embodiment example of a flat input keyboard in FIG. 3 in accordance with the invention, partly cut open, whereby here the first contact sheet and the spacing layer are embodied as individual elements.

The extremely flat design of the flat input keyboard facilitates ergonomically favorable hand operation without any additional constructive efforts being necessary, because the user's hands can lightly rest in front of the keyboard. The user's hands do not have to be raised to access the keys. Between the covering layer 26 and the electric switching system there is arranged a buffer layer 24, which transmits to the electric switching system the finger pressure applied to the covering layer 26 at the spots defined by the keyboard pattern 28. The finger pressure required to actuate the keys is thus low, so that safe key contacting as well as speedy, quiet and comfortable keyboard operation is achieved. Of course it is quite easy to adapt the keyboard pattern 28 as well as the other modules to the respective requirements of the user, as incidentally is the case with the overall design of the covering layer. FIG. 3 and FIG. 4 show the third embodiment example of the flat input keyboard in accordance with the invention; there the supporting layer 10 consists of a castable plastic material, whereupon the first contact sheet 12, the spacing layer 16, the second contact sheet 20 as well as the buffer layer and the covering layer 26, which are made of the same plastic material as the supporting layer 10, follow. The supporting layer 10 and the covering layer 26 are joined together by a cast circumferential edge web 48, which also integrates the edge webs 30 and 32 (FIG. 3), so that they together form a single piece. The covering layer 26 is no longer shown as a layer, instead it has embossed keys. In spite of this, the surface of the covering layer is a closed surface.

The first contact sheet 12 and the spacing layer 16 are hereby embodied as individual elements, as this is further described below in reference to the embodiment example in FIG. 5, without it however being necessary to further describe this detail in conjunction with the embodiment example in FIG. 4. Flow openings 19 can be seen in the second contact sheet 20; during production of the flat input keyboard, these are penetrated by the plastic material so that the individual functional layers of the flat input keyboard are joined and secured in their relative positions to each other. The flow openings are arranged in such a manner that they are positioned in the spaces between segments of the spacing layer and the first contact sheet.

The segments of the spacing layer not only form the contact openings 18 but also form air ducts between the contact openings; when a key is pressed, air is pushed out of the contact opening into the air ducts, and when the key is released the air can flow back into the contact opening.

The production of the flat input keyboard in accordance with FIG. 3 and FIG. 4 is described as follows: First a polyurethane mixture is poured into a suitably formed flat mold that is open at the top to obtain an appropriately thick covering layer 26, buffer layer 24 and edge webs 30. Next the layer is partly cured. Next, the electric switching system consisting of the first contact sheet 12, the spacing layer 16 and the second contact sheet 20 is placed upside down onto the previously produced layer. Next a further curable polyurethane mixture is poured whereby the quantity used is on the one hand adequate to provide the supporting layer 10 and, on the other hand, to provide the circumferential edge web 48. Thereby the plastic material flows into the flow openings 19 to provide a connection with the first layer cast in the mold so that connecting webs between the buffer layer and the supporting layer 10 are provided to ensure a permanently stable position of the electric switching system 12, 16, 20. When placing the electric switching system 12, 16, 20 into the mold, care is of course taken to ensure that adequate circumferential spacing between the said system and the said mold is provided to facilitate manufacturing the circumferential edge web 48, whereby all positioning and dosing processes can be controlled by suitable electronic control facilities or robots or the like.

Next the plastic material is fully cured, whereupon the flat input keyboard, to which at this stage the keyboard pattern 28 has not as yet been applied, is removed from the mold. Next the keyboard pattern is applied to the covering layer 26, for example by using a screen printing method. After the usual testing, the flat input keyboard is ready for shipment.

Figure 5:
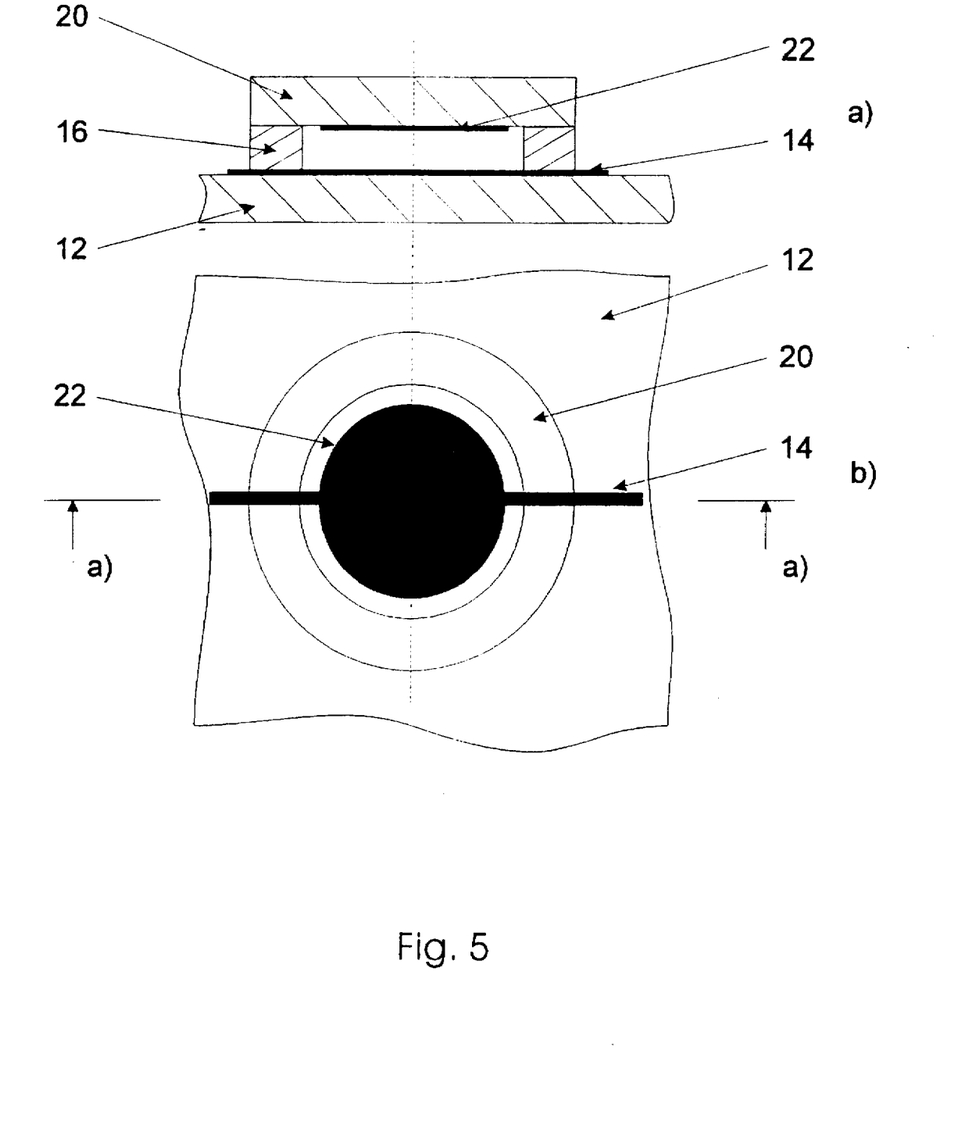
FIG. 5 shows a fourth embodiment example of part of a flat input keyboard in accordance with the invention, whereby FIG. 5a) shows a section along line a)–a) of FIG. 5b and FIG. 5b) is a plan view of the embodiment example.

In the embodiment example in FIG. 5, the contact sheet 12, which consists of flexible plastic material, is continuously formed. It carries discrete electric conductors which represent the first contact layer 14. The spacing layer 16 merely consists of spacing layer sections, which enclose the corresponding contact spot of the keyboard pattern. The second contact sheet 20 is not continuously formed; instead it has the shape of circular surfaces with a diameter of the outer diameter of the spacing layer segments of spacing layer 16, whereby on the side facing the first contact layer 14 there is a second contact layer consisting of 22 circular shaped electric contacts.

Figure 6:
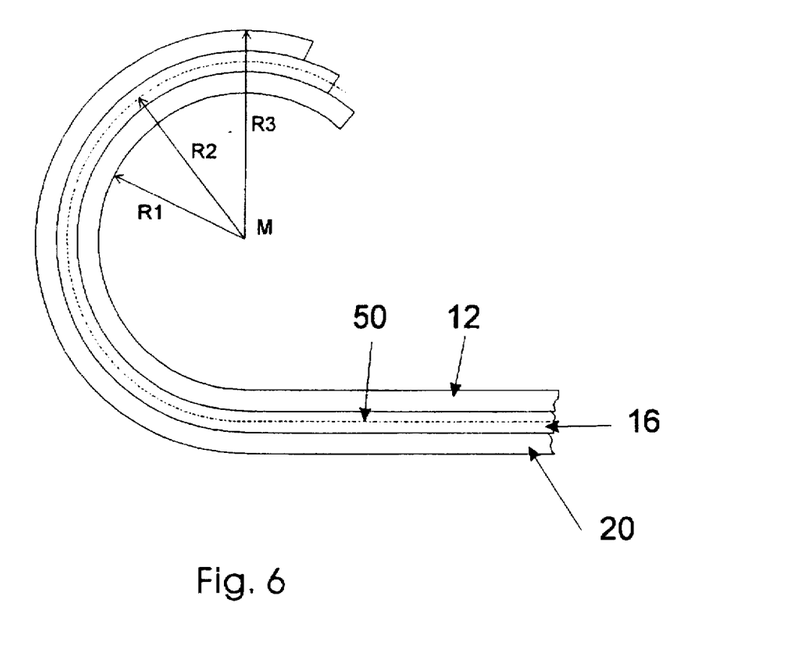
FIG. 6 shows the bending shift in a flat input keyboard according to FIG. 1, whereby a section vertical to the roll axis is shown.
Figure 7:
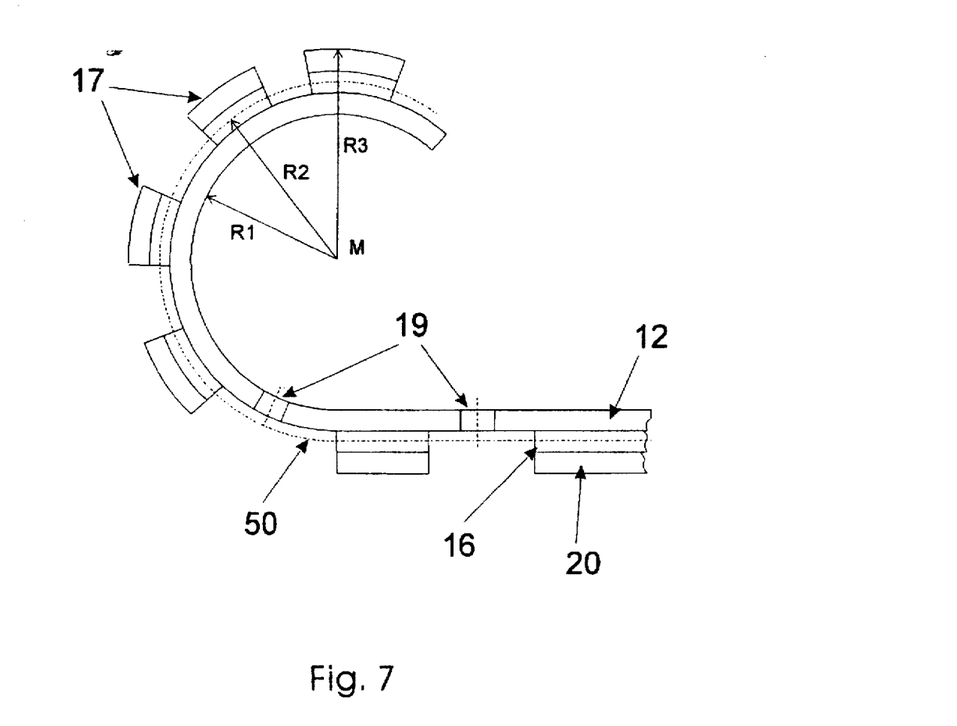
FIG. 7 shows the bending shift in a flat input keyboard when the sheets are segmented.

The different conditions that arise when the flat input keyboard according to FIG. 1 and FIG. 2 on the one hand and FIG. 5 on the other hand are bent or rolled are compared in FIGS. 6 and 7.

FIG. 6 shows three different bending radii: R1 for the first contact sheet 12, R2 for a neutral phase 50 located approximately centrally in the continuous spacing layer 16, and R3 for the second also continuous contact sheet 20, i.e. in correspondence with the embodiment example shown in FIG. 1 and FIG. 2; the Figure also shows that there is a tendency towards relative lengthwise shifting of the individual layers with respect to each other. When there are tight bending radii or long layer systems that are fully adhering, the forces resulting from the trend to have differences in length cannot be absorbed by the elasticity of the layer material so that in unfavorable conditions the adhesive layers may detach themselves or at least shift permanently so that the functioning of the system can be detrimentally affected.

In FIG. 7 however, relating to the embodiment example in FIG. 5, such problems do not occur because the function elements consisting of the individual spacing layer segments 16 and the second contact sheet segments 20 can apparently readily shift their position with respect to the full-surfaced first contact sheet 12, so that here the different bending radii are of no consequence. In spite of their low bending radii and a large number of bending processes, the sheet segments 17 maintain the functionality and dimensional accuracy of the electric switching system 12, 16, 20.

The reason for this is that an individual sheet, such as the first contact sheet 12, even when it incorporates an electroconducting layer or has printed conductors on it corresponding to contact layer 14, will behave neutrally when it is bent to a certain radius that depends on the thickness of the material. It is not destroyed and not subjected to any serious pressure forces. In the embodiment example of FIG. 5, further detailed in FIG. 7, this individual sheet represents the first contact sheet 12 to which is applied a first contact layer 14 in the form of discrete conductors. Of course the relationships may be turned around, namely by having the second contact sheet 20 continuous and having the first contact sheet 12 made up of discrete contact sheet segments.

On the first contact sheet 12, which carries the first contact layer 14 in the form of discrete conductors as per FIG. 5, the sheet segments 17 enclosing the contact spots are applied in the form of a spacing layer 16. The segments enclose the area of the contact spots and provide a support area of a defined width around this spot. Further, the sheet segments 17 of the spacing layer 16 form those air ducts between the contact openings 18 which provide a permanently adequate pressure equalization in the contact openings. On the side of the contact sheet segment 20, which is opposite to the comb-like intermeshing of the conductor ends in the first contact layer 14 of the first contact sheet 12, there is applied a layer of conducting material corresponding to the size of the contact spot and which is a component of this second contact layer 22 which consists of these discrete circular areas.

A force applied from the side of the contact sheet segment 20 will, at the pressure point, cause the forced contact sheet 20 to bend through the edges of the spacing layer segment 16 and thus come into contact with the opposing contact layer 14 of the first contact sheet 12. This contact provides an electrically conducting connection between the comb ends of the conductor s of the first contact layer 14 on the first contact sheet 12, and the corresponding signal can be evaluated.

The spacing layer segments 16 are firmly glued to the first contact sheet 12, which, as the first contact layer 14, carries the electric conductors, and to the contact sheet segment 20. This bonding of the spacing layer segments 16 and the contact sheet segment 20 can cover both an individual contact spot or several combined contact spots. In the latter case the bond will appropriately consist of strips, which are then applied to the first contact sheet 12 next to each other, whereby the strip axis appropriately contains air ducts and lies parallel to the roll axis. This arrangement ensures that the entire bonded system can be bent without the individual layers being able to shift against each other. The length of a bond between the first contact sheet 12, spacing layers 16 and a second contact sheet segment 20 is small enough compared with the thickness of the layers to ensure that for even for smaller bending radii no larger length changes in the individual layer segments can occur against each other.

The state of the art is a flexible keyboard that is described in U.S. Pat. No. 5 220 521. The keyboard described there has no closed surface like the one provided in the present invention. It is thus susceptible to contamination and liquid penetration.

Further, in the present invention, segmentation of the sheet layers is provided in accordance with claim 1, which provides for a considerably easier assembly of the roll-up keyboard. In particular the devices described in Document U.S. Pat. No. 5 220 521, which permit relative movement between the layers, are not required (column 3, lines 51–56). Compared with the existing documents, the object of the invention was to provide a closed surface of the casing and to allow easy roll-up of the keyboard while having a considerably simplified structure.

REFERENCE LIST FOR DRAWINGS 10 supporting layer
12 first contact sheet
14 first contact layer
16 spacing layer
17 sheet segments
18 contact opening
19 flow opening
20 second contact sheet
22 second contact layer
24 buffer layer
26 covering layer
28 keyboard pattern
30 edge web
32 edge web
34 plug connection
36 illumination facility
38 control unit
40 support plate
42 recess
44 baseplate
46 computer mouse
48 circumferential web of the casing
50 neutral phase

I claim:

1. Flat input keyboard for data processing machines or the like, which, starting on the side facing away from the operation side, has a supporting layer (10), an electric switching system (12, 16, 20) with electric contact spots corresponding to a keyboard pattern and a flexible elastic covering layer (26) having a keyboard pattern and provided on the operation side facing away from the electric switching system wherein the supporting layer (10), the multi layer electric switching system (12, 16, 20) and the covering layer (26) are interconnected at least along their circumference, wherein the electric switching system (12, 16, 20) is provided with desired bending lines, which are formed through segmentation (17) of individual or several sheet layers of the electric switching system.

2. Flat input keyboard according to claim 1 characterized by, that the supporting layer (10), the electric switching system (12, 16, 20), the buffer layer (24) and the covering layer (26) are formed in an essentially elongated manner; and that the supporting layer (10) has at least on one side an essentially rigid first edge web (30, 32) that runs parallel to the roll axis.

3. Flat input keyboard according to claim 1, characterized by, that the electric switching system (12, 16, 20) has a short-stroke keyboard with short-stroke keys rigidly affixed to a flexible board or the like.

4. Flat input keyboard according to claim 1, wherein the electric switching system (12, 16, 20) in a mold has flow openings for receiving plastic material therethrough in such a way to form in the in the final condition a single-piece seamless casing (48) for the electric switching system.

5. Flat input keyboard according to claim 4, characterized by a number of connecting webs passing through flow openings (19) in the electric switching system (12, 16, 20) so that the supporting layer (10), the buffer layer (24) and the covering layer (26) are joined to each other, thereby fixing the relative positions of the function elements of the electric switching system.

6. The method according to claim 5 further including the step of applying the keyboard pattern to the covering layer after the casting, injection molding or steaming and curing process as any necessary mold-removal has been completed.

7. Flat input keyboard according to claim 1, . . . unchanged first contact sheet (12) to which is applied at least zonally a first contact layer (14), next a spacing facility (16) provided with openings (18) that correspondingly match the keyboard pattern (28), and on the side facing towards the spacing facility (16) a second contact sheet (20) to which is applied at least zonally an electroconductive second contact layer (22).

8. Flat input keyboard according to claim 7, characterized by, that between the second contact sheet (20) and the covering layer (26) there is arranged an elastically yielding buffer layer.

9. Flat input keyboard according to either of claims 7 and 8, characterized by, that the spacing facility is at least partially comprised of the discrete spacing elements (16) surrounding the contact points corresponding to the keyboard pattern (28) and of the air ducts connecting these.

10. Flat input keyboard according to claim 9, characterized by, that the spacing elements (16) are essentially formed as a ring-shaped area.

11. Flat input keyboard according to either of claims 9 or 10, characterized by, that one of the contact sheets (12, 20) is at least zonally comprised of the discrete contact zones corresponding to the spacing elements (16).

12. Flat input keyboard according to claim 11, characterized by, that the contact zones are essentially formed as a ring-shaped area.

13. Flat input keyboard according to one of claims 9 through 10, characterized by, that one of the contact sheets (12, 20) carries all of the discrete electric conductors.

14. Flat input keyboard according to claim 13, characterized by, that at the contact spots corresponding to the keyboard pattern (28), the conductors reach into each other in a comb-like manner.

15. Flat input keyboard according to claim 14 characterized by, that the contact zones on the side facing towards the spacing elements have an essentially complete electroconductive coating and that at least one contact sheet (12, 20) carries the discrete electric conductors.

16. Flat input keyboard according to one of the preceding claims, characterized by, that the electric contact spots of the contact sheets (12, 20) are arranged in rows parallel to the roll axis.

17. Flat input keyboard according to one of the preceding claims, characterized by, that at least one of the sheets of the electric switching system (12, 16, 20) comprises a number of sheet segments (17) running parallel to the roll axis.

18. Flat input keyboard according to one of the preceding claims, characterized by, that at least one of the outer lying sheets of the electric switching system (12, 16, 20) in combination with the spacing facility (16) comprises a number of sheet segments (17) running parallel to the roll axis.

19. Flat input keyboard according to one of the preceding claims, characterized by, that all the sheets of the electric switching system (12, 16, 20) in combination comprise a number of sheet segments (17) running parallel to the roll axis.

20. Flat input keyboard according to claim 1 characterized by, that the supporting layer (10) has at least on one side a second edge web that is essentially perpendicular to the roll axis.

21. Flat input keyboard according to claim 2 or 20, characterized by, that at least the first edge webs (30, 32) are detachably connected to the supporting layer (10), the electric switching system (12, 16, 20), the buffer layer (24) the covering layer (26).

22. Flat input keyboard according to claim 2 or 20, characterized by, that at least the first edge webs (30, 32) are a fixed part of the casing (48).

23. Flat input keyboard according to claim 20 or 21, characterized by, that at least the second webs (30, 32) are flexibly formed around the roll axis.

24. Flat input keyboard according to one of claims 2 through 23, characterized by, that an illumination facility (36) which illuminates the keyboard pattern from the side is integrated in at least one of the edge webs (30, 32).

25. Flat input keyboard according to one of claims 2 through 23, characterized by, that there is a connector cable firmly integrated in one of the edge webs.

26. Flat input keyboard according to one of the preceding claims, characterized by a detachable plug connection (34) for connecting to a data processing unit or the like.

27. Flat input keyboard according to one of claims 2 through 26, characterized by, that the plug connection (34) is integrated in one of the edge webs (30, 32).

28. Flat input keyboard according to one of the preceding claims, characterized by, that a part of the keyboard pattern (28) of the covering layer (26) is formed as the operating area for a computer mouse (46).

29. Flat input keyboard according to one of the preceding claims, characterized by, that a control unit (38) is integrated in one of the edge webs (30, 32).

30. Flat input keyboard according to claim 29, characterized by, that the control unit (38) comprises an SMD module.

31. Flat input keyboard according to one of the preceding claims, characterized by, that there are optical display facilities integrated in a part of the keyboard pattern (28) the covering layer (26) or in the edge webs (30, 32).

32. Flat input keyboard according to one of the preceding claims, characterized by, that there are acoustic display facilities integrated in a part of the keyboard pattern (28) the covering layer (26) or in the edge webs (30, 32).

33. Flat input keyboard according to one of the preceding claims, characterized by, that there are transmitter and receiver units for digital signals integrated in a part of the keyboard pattern (28) the covering layer (26), the buffer layer (24) or in the edge webs (30, 32).

34. Flat input keyboard according to one of the preceding claims, characterized by, that there are power sources integrated in a part of the keyboard pattern (28) the covering layer (26), the buffer layer (24), the circumferential edge web or in the edge webs (30, 32).

35. Flat input keyboard according to one of the preceding claims, characterized by an accessory base formed as a support plate (40) and/or baseplate (44) for incorporating the supporting layer (10), the electric switching system (12, 16, 20), and if need be the edge webs (30, 32).

36. Flat input keyboard according to claim 35, characterized by, that the baseplate (44) has on its upper side a recess (42) with a level support area for receiving in a form-closed manner the supporting layer (10) and/or the support plate (40) and if need be the edge webs (30, 32).

37. Flat input keyboard according to one of the preceding claims, characterized by, that the electric switching system (12, 16, 20) has a sensor keyboard that is essentially free of mechanically movable function elements.

38. Flat input keyboard according to one of the preceding claims, characterized by extended air chambers corresponding to the keyboard pattern (28) for application under extreme pressure conditions or the like.

39. A method for manufacturing a flat input keyboard comprising the steps off;
   casting an electric switching system in plastic material, forming the supporting layer the buffer layer, the covering layer and a continuous circumferential edge web of the casing, and joining the supporting layer, buffer layer, and covering layer to a single piece by the continuous circumferential edge web.

40. The method according to claim 39 wherein the step of casting includes the step of injection molding in a die mold closed on all sides.

41. The method according to claim 39, wherein the step of casting includes using a thermoplastic or thermosetting material.

42. The method according to 39 claim further including the steps of using an electric switching system that has a multiplicity of openings both on the side where the supporting layer is to be provided as well as on the side where the covering layer and the buffer layer are to be provided; and casting the casting material into these openings, curing the material for obtaining an elastic, single-piece, spatial matrix consisting of the supporting layer, the covering layer, the buffer layer, the circumferential edge web, the casing and joining webs for penetrating the electric switching system and fixing its function elements in spatially defined relative positions, joining the supporting layer, the covering layer, the buffer layer and the circumferential edge web through the openings in the electric switching system.

43. The method according to claim 39 further including the step of:

using a polyurethane for the plastic material.

44. The method according to claim 39 further including the step of using a silicon for the plastic material.

45. A flat input keyboard manufactured according to the method of claim 38 comprising:

starting on the side facing away from the operation side, a supporting layer, an electric switching system with electric contact spots corresponding to a keyboard pattern and a flexible elastic covering layer having a keyboard pattern and provided on the operation side facing away from the electric switching system, wherein the supporting layer, the electric switching system and the covering layer are interconnected at least along their circumference , wherein the electric switching system is provided with desired bending lines, which are formed through segmentation of individual or several sheet layers.

46. The method according to claim 39, further comprising the step of elastically curing the plastic material.

47. The method according to claim 40, wherein the step of casting includes using a liquid castable and then curable elastomeric plastic material.

48. The method according to claim 47, further including the steps of using a casting mold, the inner dimensions at base level exceed the outer dimensions of the electric switching system on all sides by the width of the circumferential web to be formed, pouring into the casting mold first the covering layer and the buffer layer, allowing the first layer of the plastic material to at least partially cure; leaving the at least partially cured covering layer and buffer layer in the mold; introducing the electric switching system into the mold and placing said system on the supporting layer, providing a border the width of which corresponds to the circumferential web to be formed; then adding further liquid castable plastic material wherein the circumferential edge strip is filled up and the electric switching system is covered to a height corresponding to the thickness of the supporting layer; and then fully curing the entire plastic material and then removing the one-piece tightly enclosed flat input keyboard from the mold.

49. The method according to claim 39 further including the steps of making the parallel sections of the circumferential edge web parallel to the roll axis being made essentially rigid, and making the sections of the circumferential edge web that are perpendicular to the bending axis or roll axis essentially flexible.

50. The method according to claim 49, further including the step of making the rigid and flexible sections of the circumferential end web of the casing in different thicknesses.

51. The method according to claim 49 further including the step of using different materials for the rigid and flexible sections of the circumferential end web of the casing.

* * * * *